United States Patent [19]
Sawaya

[11] Patent Number: 6,125,170
[45] Date of Patent: Sep. 26, 2000

[54] TELEPHONE MESSAGE PRINTING METHOD AND APPARATUS

[76] Inventor: Frederick J. Sawaya, 111 E. Broadway, Salt Lake City, Utah 84111

[21] Appl. No.: 08/939,194

[22] Filed: Sep. 29, 1997

[51] Int. Cl.[7] .................................................. H04M 11/00
[52] U.S. Cl. .................................... 379/93.19; 379/93.23; 379/110.01; 379/100.01
[58] Field of Search .............................. 379/93.17, 93.19, 379/93.23, 100.01, 100.02, 100.06, 110.01, 142, 88.09, 88.11, 88.12, 88.13, 88.2, 88.21; 345/173; 382/119, 187, 188

[56] References Cited

U.S. PATENT DOCUMENTS

| | | | |
|---|---|---|---|
| 3,609,248 | 9/1971 | Wolf et al. | 179/84 VF |
| 3,870,821 | 3/1975 | Steury | 179/2 DP |
| 5,063,600 | 11/1991 | Norwood | 382/13 |
| 5,065,309 | 11/1991 | Putnam et al. | 379/110.01 |
| 5,283,818 | 2/1994 | Klausner et al. | 379/67 |
| 5,299,256 | 3/1994 | Hu | 379/96 |
| 5,467,385 | 11/1995 | Reuben et al. | 379/93.23 |
| 5,479,530 | 12/1995 | Nair et al. | 382/119 |
| 5,587,560 | 12/1996 | Crooks et al. | 345/173 |
| 5,751,793 | 5/1998 | Davies et al. | 379/88.11 |

*Primary Examiner*—Stella Woo
*Attorney, Agent, or Firm*—Gifford, Krass, Groh, Sprinkle, Anderson & Citkowski, PC

[57] ABSTRACT

In a message storage and retrieval system, visual indicia representative of a message slip is automatically generated with known information, enabling new information to be readily entered and stored in registered alignment with the slip containing the known information. In one embodiment, the visual indicia representative of a message slip is generated by actually printing a paper slip, which may be prepared before or after the entry of the new information. In an alternative embodiment, the visual indicia is generated in electronic form. The new information is preferably entered through a graphics input pad or tablet, with the known information being supplied either in printed or electronic form. If printed, the slip containing the known information may be advanced over the graphics pad in aligned registration. Alternatively, a visual representation of the slip may be displayed beneath the graphical input area and displayed at a later time.

7 Claims, 2 Drawing Sheets

TELEPHONE MESSAGE PRINTING METHOD AND APPARATUS

FIELD OF THE INVENTION

This invention relates generally to message preparation and distribution, and, more particularly, to devices and methods of use which expedite the process of completing message slips with known and new information.

BACKGROUND OF THE INVENTION

In many offices around the world, a receptionist answers the telephone, and is required to fill out message slips for various personnel upon receipt of incoming calls. Typically these slips, which might bear a phrase such as "while you were out," include places the fill in the name, company and telephone number of the individual originating the call, the name of the individual to which the message should be directed, the date and the time of day. In addition, there is a section for entering a more particularized message, and boxes to check such as "returned your call," or "will call again."

This process of filling out message slips can be quite inefficient, especially if only one or a few receptionists are required to answer calls for a large number of individuals who may be coming and going. Ironically, certain of the information placed on the slip, such as date and time, could be generated electronically, thereby streamlining the process. As such, any system or method of use which could automate any aspect of this procedure would be welcomed by the business community.

U.S. Pat. No. 5,299,256 to Hu entitled PBX TELEPHONE WITH MESSAGE PRINTER discloses a digital telephone including a display and a printer mechanism having the capability to print information corresponding to what is currently displayed as well as messages from other stations. The messages may be printed out as they come to the station, or may be stored in memory for subsequent print out, thereby obviating the need for filling out hand-written message slips since, instead, a printed copy of each message can be directly provided and distributed to the appropriate personnel.

Although the system described by Hu is quite versatile for its intended purpose, it is limited in that it is intended for incorporation into a digital PBX system with a level of sophistication that might be unaffordable to smaller businesses. In addition, since new information is entered exclusively through the use of a keyboard, some form of general-purpose computer is required, as there is no provision for entering graphical information or for handwriting recognition.

SUMMARY OF THE INVENTION

The present invention resides in a message storage and retrieval system, wherein visual indicia representative of a message slip is automatically generated with known information, and wherein new information may be readily entered and stored in registered alignment with the slip containing the known information. In one embodiment, the visual indicia representative of a message slip is generated by actually printing a paper slip, which may be prepared before or after the entry of the new information. In an alternative embodiment, the visual indicia is generated in electronic form.

In the case of a printed slip, the invention preferably includes a graphics input pad or tablet, a printer fed by a supply of message slips, and means for advancing the supply of message slips so as to place a new message slip into overlying registration with respect to the graphics input pad. A clock and calendar module is provided to generate an electrical signal representative of time and date, and a memory is used for storing message-related information. A controller, preferably in the form of a microcomputer, is programmed with inventive software to perform the following functions:

a) position a new message slip into overlying registration with respect to the graphics input pad, b) store into the memory, and print onto the slip, known information relating to the incoming call, including the time and date of the call, and c) receive and store into the memory new information relating to the call through the graphics input pad as it is written onto the slip.

In a more comprehensive embodiment of the invention wherein a slip is actually printed, the system further includes an interface adapted for connection to a telephone network, and the controller is further programmed to position a new message slip into overlying registration with respect to the graphics input pad upon receipt of an incoming telephone call. The telephone interface also preferably includes further includes a caller-identification (caller-ID) capability, and the controller is further capable of storing into the memory, and printing onto the slip, additional known information relating to the incoming call, including the telephone number associated with the incoming call.

The memory is provided for the storage of both the known and new information, enabling a subsequent retrieval of such information, for example, in the event that the physical message slip becomes lost or misplaced. The entry of the new information in graphical form may either be stored as graphics and recalled in that matter, or, more preferably, may be digitized into ASCII form through appropriate handwriting-recognition software. Although the invention itself may be supplied with sufficient memory to recall and display the stored information on an independent stand-along basis, more preferably a computer interface is provided to download the information into a personal computer, either immediately upon receipt of the information, or later, in batch fashion.

In an alternative embodiment of the invention, a message slip may be presented in electronic form, for example, by displaying a visual representation beneath a graphical input pad or tablet with boxes and/or lines to be completed. In this case, the completed message may be generated after the entry of the new information and, as an alternative to the actual printing of a paper message slip, a visual representation of a slip may be "routed" to an intended recipient by way of an electronic network, for example.

DETAILED DESCRIPTION OF THE INVENTION

Figure 1:
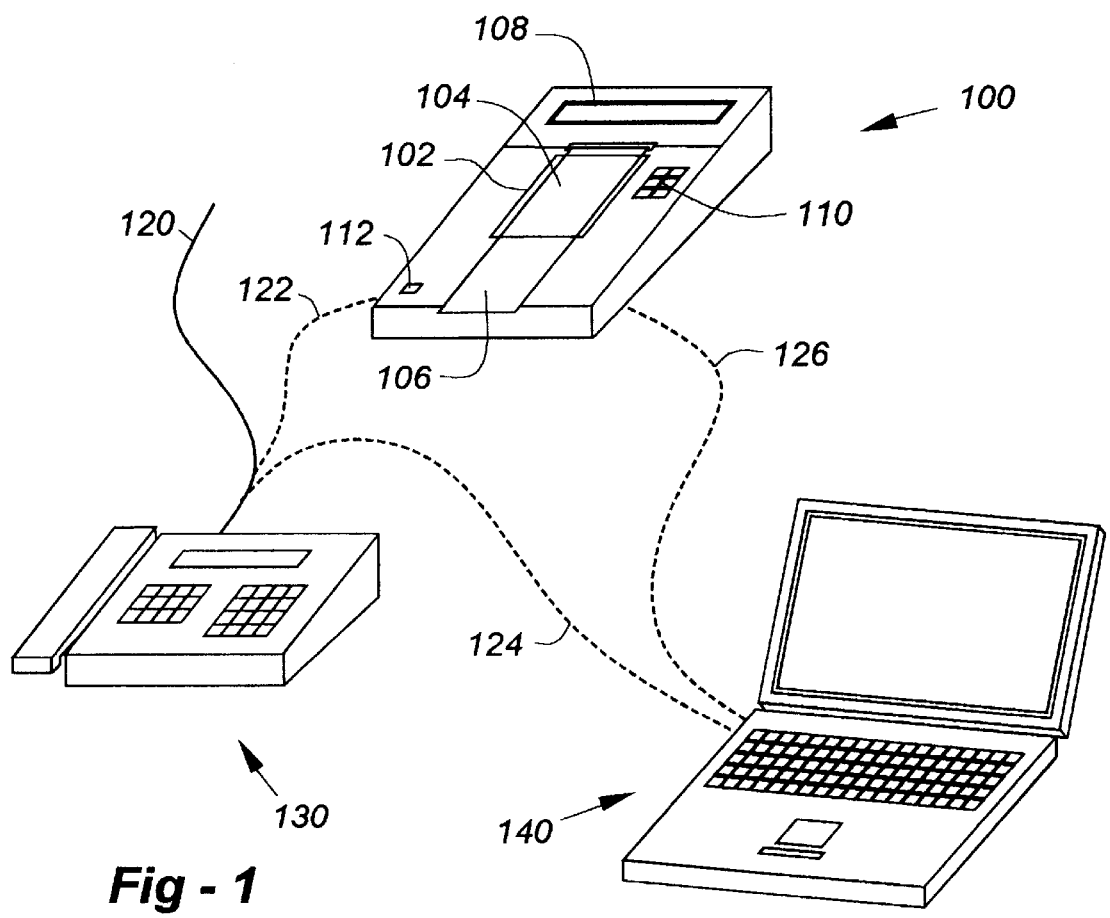
FIG. 1 shows an embodiment of this invention, as seen from an oblique perspective in use in conjunction with a telephone and optional computer system.

In FIG. 1 there is shown generally at 100 a device according to the invention in use in conjunction with a telephone system 130 and computer workstation 140. Broadly, the invention automates the task of generating message slips of the type prepared by a receptionist, by gathering known information such as time and date, while automating and digitizing the entry of new information which is typically of a more custom nature. Overall, the embodiment of the invention depicted in FIG. 1 includes an enclosure 101 having a graphics-input pad 102 through which handwritten entries may be received, preferably through the use of a touch-sensitive matrix of the kind currently incorporated into personal digital communicators such as the Newton product offered by the Apple Computer Company. A touch-sensitive pad is preferred, since any type of stylus (i.e., one which is non-magnetized) may be used for the entry of hand-written information.

The system further includes a printer, not visible in FIG. 1, fed by a supply of paper preferably including score marks spaced apart to permit individual slips to be torn off and routed, as appropriate, once prepared by the system. As an alternative to scored raw material, non-scored material may be used with the enclosure including means for cutting or tearing the individual slips to permit distribution.

As can be seen from the figure, the supply of paper from the printer causes a new slip such as 104 to be juxtaposed in overlying registration with the underlying graphics pad 102, thereby enabling information manually entered onto the slip 104 to also be entered into the system through the graphics pad 102 for subsequent storage. Slip 106 illustrates a message slip previously prepared by the system which has not yet been detached.

A basic embodiment of the invention further includes a display 108 for status information or programming purposes, and a user-input device such as keypad 110 and/or push-button 112.

Figure 2:
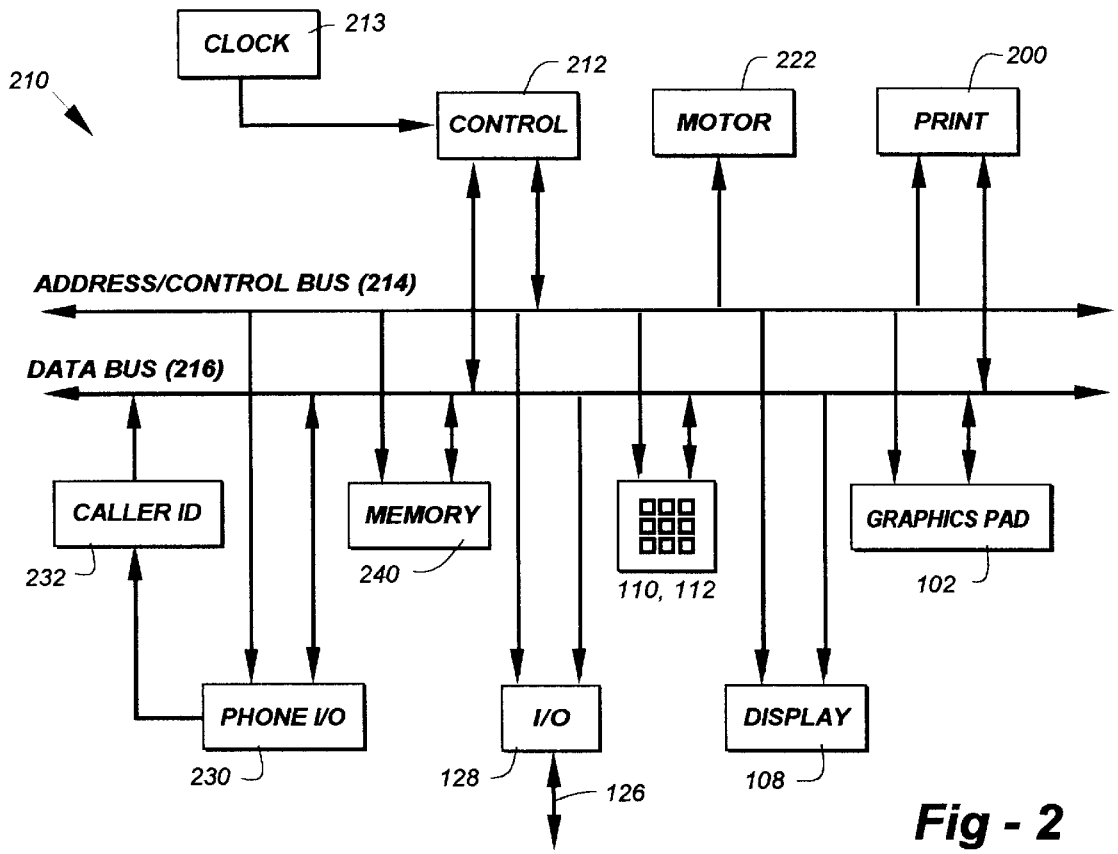
FIG. 2 is a block diagram illustrating major electrical components of a system according to the invention.

As best seen in FIG. 2, this embodiment of the invention preferably further includes electronics for printing known information onto each new message slip prior to the entry of new information in graphical form. In its most basic form, the invention includes clock and timer circuitry operative to generate an electrical signal indicative of the date and time, such that upon the request or need for each new message slip, such information will automatically be generated onto the paper prior to being fed over the graphics pad to receive the new information in graphical form. As discussed in further detail below, the advancement of the paper to create a new message slip may be brought about either through the entry of a user command such as depression of a push-button such as 112, or, the unit may be coupled to a telephone line 120 through a connection 122 and include circuitry operative to automatically advance the paper supply upon receipt of each incoming telephone call.

In the event that the invention does contain a telephone interface, other known information may become available, in which case this additional information may also be preprinted onto a message slip prior to the entry of additional, new information. For example, caller-ID capabilities may be provided, in which case the designation of the calling party and/or the number of the calling party may become known and pre-printed and/or stored.

To assist in the entry of the new information in graphical form, the paper supply may contain pre-printed message-related indicia such as boxes to check or lines to be filled in with the information. Software associated with the graphics pad will also preferably be included to know the location of these areas in advance, so that the checking of a particular box on a slip overlying graphics pad 102 will automatically be entered in the proper context. To save on the cost of the paper supply, as an alternative to pre-printed raw material, blank paper may be used, assuming the printer is sufficiently fast to print not only the known information, but any and all boxes, lines, and the like to assist in the entry of the new information as well.

According to a preferred embodiment of the invention, a memory is provided for the storage of both the known and new information enabling a subsequent recall, for example, in the event that the physical message slip becomes lost or misplaced. The entry of the new information in graphical form may either be stored as graphics and recalled in that matter, or, more preferably, may be digitized into ASCII form through appropriate handwriting-recognition software. As a further alternative, both the graphical (i.e., bit-map) version of the new information and any digitized version(s) may be stored redundantly, for example, to confirm the accuracy of the manually entered new information or the conversion of such information into electronic form.

Although the invention itself may be supplied with sufficient memory and/or a display or monitor to effectuate the recall of the stored information on an independent stand-along basis, more preferably an interface 126 to a computer 140 is provided, enabling the information gathered by the inventive device to be downloaded into the computer 140 for viewing and/or subsequent recall. The downloading of this information may occur immediately upon receipt of such information, enabling the unit 100 to have little, if any, storage capability, or, alternatively, and more preferably, the unit 100 will have sufficient memory to store an entire day's worth of messages or more than that amount, with the downloading then being carried out in batch fashion to the computer 140.

Now turning to FIG. 2, there is shown in block-diagram form, major electrical components and subsystems comprising the invention. The block diagram, depicted generally at 210, preferably includes a controller 212 which may be a microprocessor or single-chip microcomputer of conventional design such as a Pentium unit from the Intel Corporation or an alternative device, assuming it has sufficient processing capability to carry out the functions disclosed herein. The controller 212 is fed by a crystal-controlled clock 213, enabling the controller to set, calculate and update time of day and day of year.

As is typical in microcomputer system design, the controller 212 interfaces to an address/control bus 214 and a data bus 216 to which various other components and subsystems connect for the exchange of information. For example, in the event that the controller 212 does not contain sufficient on-board memory to store appropriate amounts of known or new information or software program storage, an auxiliary memory 240 may be provided which interfaces to the address/control bus in unilateral fashion, but wherein data is exchanged with bus 216 is bilateral form.

Connection of the keypad such as 110 and 112 in FIG. 1 and display 108 in FIG. 1 is similarly configured, except that data in both cases is essentially unilateral from the keyboard and to the display, as shown. The same holds true of printer 220 and graphical input pad 102, in that data is received from the pad 102 but sent to the printer 220. The motor 222 which drives the paper supply need not interface to the data bus, but may be tied directly to the address/control bus through appropriate decoding circuitry.

In the event that the invention is interfaced to a computer as shown in FIG. 1 for the downloading and retrieval of known and new information for archival purposes, an appropriate serial or parallel input/output (I/O) unit 228 may be provided between the address/control and data buses and interface line 126 which will typically be bidirectional for handshaking purposes.

In the event that the invention is equipped with a telephonic interface, a telephone I/O module 230 will be provided to one or more telephone lines 112, which may either be dedicated upons or adapted for PBX connection, depending upon overall system configuration. A module 232 would then be provided to detect and route caller-ID information received through the telephone I/O block 230 to the data bus 216 to be retrieved by controller 212 for storage and/or printing.

Figure 3:
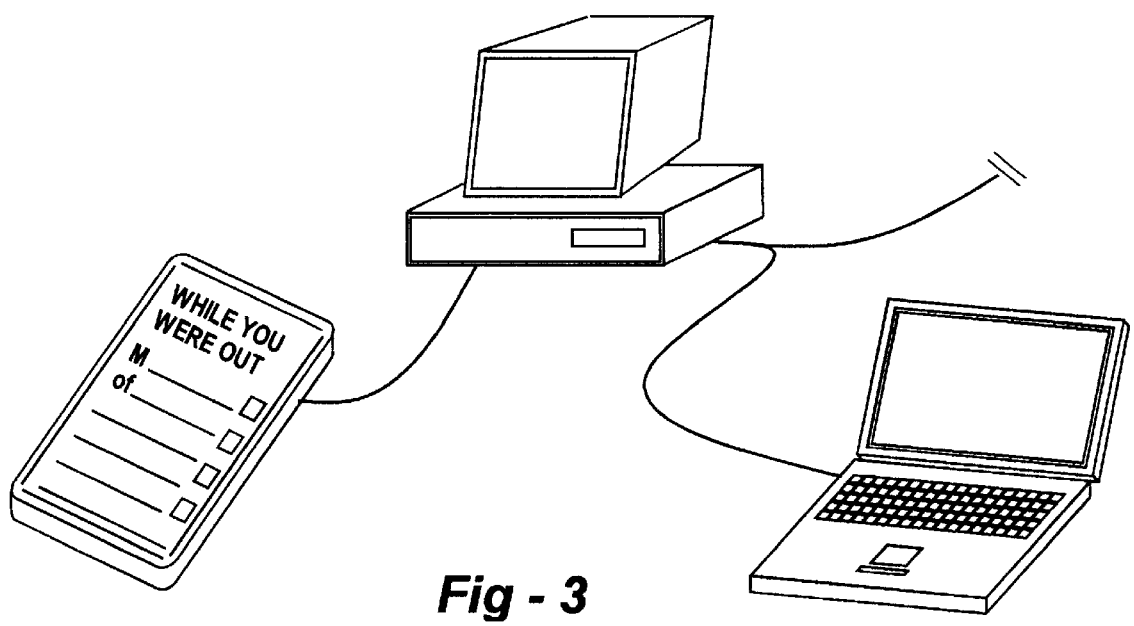
FIG. 3 is a drawing of an alternative embodiment of the invention including a display in overlying alignment with the graphic input pad.

FIG. 3 illustrates an alternative embodiment of the invention wherein a display is provided beneath the graphics-input pad, enabling a "message slip" to be shown in electronic form along with boxes, lines, and the like to facilitate the entry of new information. In this case, upon receipt of a user command or incoming call, a new message slip is software-generated, and would appear in registration with the graphics pad, in much the same manner that information may be displayed beneath the graphics pad of existing personal digital communicator devices.

As with the previously described embodiment of the invention, when the display of the message slip appears on the graphics pad, it will also be displayed with any known information available, at least including time of day and date of the call, and may also include caller-ID derived information in the event of a telephone interface. The difference between this embodiment and that described with reference to FIG. 1 in particular, is that printing would not occur prior to the entry of the new information, but instead, would occur after all new information is entered onto the graphics pad. Indeed, according to this alternative embodiment of the invention, in the event that the device is connected to a local-area network, message slips may be routed electronically to appropriate personnel, thereby alleviating the need for printing all together.

Figure 4:
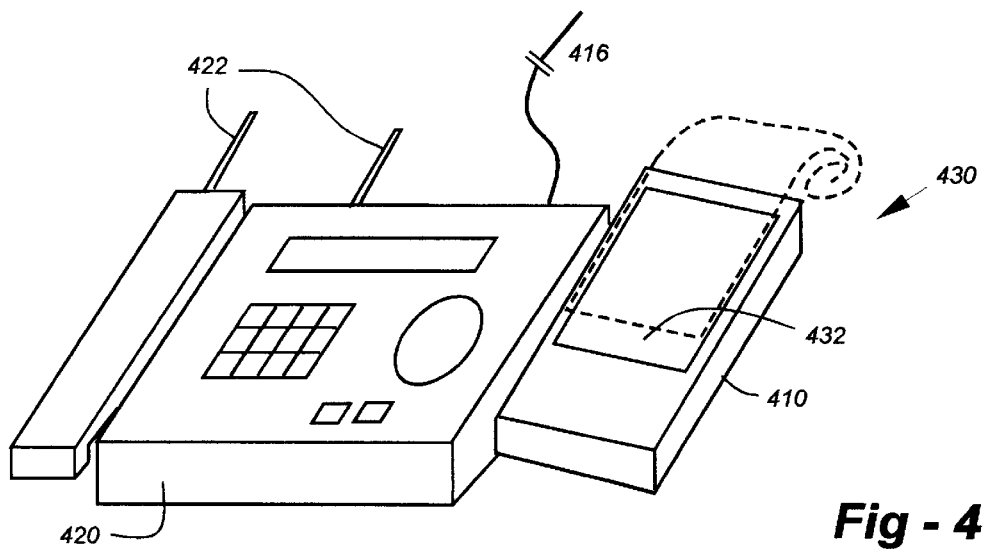
FIG. 4 is a drawing of yet a further alternative embodiment of the invention adapted for use in conjunction with a telephone answering machine.

FIG. 4 is a drawing of an alternative embodiment of the invention wherein a graphical input device 410 is interfaced to telephone answering machine 420. As indicated by the antennas 422, the answering 420, which is connected to a telephone line 416, may integrate a telephone, including a telephone of the cordless type.

The graphics input device 410 is at least electrically interfaced to the answering machine 420 and, may further be physically integrated therewith, resulting in a convenient, unitary enclosure. A paper feed and printing mechanism 430 may be provided to generate a hard copy of message slips, either before or after the entry of new information or, alternatively, messages may be input and retrieved entirely electronically, preferably by viewing them on the display/input portion 432 of the graphics input device 410.

By virtue of the arrangement discussed with respect to FIG. 4, incoming calls may be received, and voice messages stored, either in analog or digital form, along with any known information such as time, date, or caller identification information, if available. Upon the retrieval of messages by a user, a new information entry area will appear on the screen/input section 432 of the graphical input device 410, indicating the known information, and enabling the user to write, on the pad 432, other new information, for example, information relating to the stored voice message. In the event that the unit preprints a message slip with the known information and juxtaposes this printed slip over the input area 432, upon entry of the new information the user will expressly receive a hard copy relating to each message of interest. In the event that the new information is entered through the pad 432, a message slip may, or may not, be later printed, as desired. In all cases, however, due to the entry of the new information through the input area of the device 410, the system will be able to store indicia relating to messages received and the actual voice messages, as entered by the user of the apparatus. As with the other embodiments of the invention, the new, manually entered information may be stored in a bit-map or graphical form or, alternatively, converted into a digital representation utilizing handwriting recognition capabilities.

I claim:

1. A telephone message storage and retrieval system, comprising:

a graphics input pad;

a printer fed by a supply of telephone message slips;

means for advancing the supply of telephone message slips so as to place a new message slip into overlying registration with respect to the graphics input pad;

a clock and calendar module operative to generate an electrical signal representative of time and date;

a memory for storing telephone message-related information;

an interface adapted for connection to a communications network; and a controller in electrical communication with the graphics input pad, means for advancing the supply of telephone message slips, the clock and calendar module, and the memory, the controller being programmed to perform the following functions:

a) position a new telephone message slip into overlying registration with respect to the graphics input pad, b) store into the memory, and print onto the slip, known information relating to the incoming call, including the time and date of the call, and c) receive and store into the memory new information relating to the call through the graphics input pad as it is written onto the slip.

2. The telephone message storage and retrieval system of claim 1, wherein the controller is further programmed to position a new message slip into overlying registration with respect to the graphics input pad upon receipt of an incoming telephone call.

3. The telephone message storage and retrieval system of claim 2, further including a caller-identification capability, and wherein the controller is further capable of storing into the memory, and printing onto the slip, additional known information relating to the incoming call, including the telephone number associated with the incoming call.

4. The telephone message storage and retrieval system of claim 1, further including:

a memory for storing and retrieving voice messages received through the telephone network;

and wherein the controller is further programmed to position a new message slip into overlying registration with respect to the graphics input pad upon the retrieving of a voice message.

5. The telephone message storage and retrieval system of claim 1, further including an interface to a computer having a memory and a display, and wherein the controller is further capable of downloading both the known and new information to the computer for storage and review on the display.

6. The telephone message storage and retrieval system of claim 1, further including a handwriting recognition capability, and wherein the new information relating to the call received through the graphics input pad as it is written onto the slip is converted into a electronic character representation.

7. The telephone message storage and retrieval system of claim 6, wherein the new information is stored in both a graphical form as written onto the slip and as the electronic character representation.

\* \* \* \* \*